（12）United States Patent
Claussen et al.

(10) Patent No.: US 9,326,201 B2
(45) Date of Patent: Apr. 26, 2016

(54) DETECTING AND REPORTING A PICOCELL BY A MOBILE STATION

(75) Inventors: Holger Claussen, Swindon (GB); Lester Tse Wee Ho, Swindon (GB); Louis Gwyn Samuel, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 2757 days.

(21) Appl. No.: 11/615,027

(22) Filed: Dec. 22, 2006

(65) Prior Publication Data

US 2008/0153533 A1    Jun. 26, 2008

(51) Int. Cl.
*H04W 36/00* (2009.01)
*H04W 36/04* (2009.01)
*H04W 36/32* (2009.01)

(52) U.S. Cl.
CPC .............. *H04W 36/04* (2013.01); *H04W 36/32* (2013.01)

(58) Field of Classification Search
CPC ... H04W 84/045; H04W 48/16; H04W 48/08; H04W 88/08; H04W 48/02; H04W 36/04; H04W 48/20; H04W 36/0083; H04W 36/0061; H04W 76/02; H04W 36/08; H04W 36/10; H04W 36/00; H04W 36/0055; H04W 52/02; H04W 86/06; H04W 64/00; H04W 16/32; H04W 36/02
USPC ......... 455/436, 437, 444, 511, 466, 566, 442, 455/432, 434, 456.1, 456.3, 439; 370/347, 370/329, 337, 252, 331, 328, 332; 340/7
See application file for complete search history.

(56) References Cited

U.S. PATENT DOCUMENTS

| | | | |
|---|---|---|---|
| 5,577,022 A | | 11/1996 | Padovani et al. |
| 5,613,204 A | * | 3/1997 | Haberman et al. ......... 455/432.3 |
| 5,673,307 A | * | 9/1997 | Holland et al. ............... 455/436 |
| 5,802,473 A | * | 9/1998 | Rutledge et al. .............. 455/446 |
| 5,905,950 A | * | 5/1999 | Anell ............................ 455/421 |
| 6,167,274 A | | 12/2000 | Smith |
| 6,285,874 B1 | * | 9/2001 | Magnusson et al. ....... 455/456.1 |
| 6,529,491 B1 | * | 3/2003 | Chang ................... H04W 48/18 370/335 |
| 6,725,052 B1 | * | 4/2004 | Raith ............................ 455/518 |
| 7,006,470 B1 | | 2/2006 | Wang et al. |
| 7,113,780 B2 | * | 9/2006 | McKenna .............. H01Q 1/007 398/115 |

(Continued)

FOREIGN PATENT DOCUMENTS

| | | |
|---|---|---|
| EP | 1045609 A1 | 10/2000 |
| EP | 1626528 A1 | 2/2006 |

(Continued)

OTHER PUBLICATIONS

Harri Holma, Antti Toskala, "WCDMA for UMTS," Wiley, 2004—pp. 245-260.

(Continued)

*Primary Examiner* — Mahendra Patel
(74) *Attorney, Agent, or Firm* — Carlson, Gaskey & Olds, P.C.

(57) ABSTRACT

An exemplary method of communicating includes storing a locating neighbor list that corresponds to a mobile station being in a communication range of a selected picocell. Upon receiving a current neighbor list, a determination is made whether the current neighbor list corresponds to the stored, locating neighbor list. If there is sufficient correspondence, that indicates that the mobile station is in a communication range of the picocell.

13 Claims, 1 Drawing Sheet

(56) References Cited

U.S. PATENT DOCUMENTS

| | | | |
|---|---|---|---|
| 7,145,890 B1* | 12/2006 | Seo et al. | 370/331 |
| 7,558,575 B2 | 7/2009 | Losh et al. | |
| 7,623,866 B1* | 11/2009 | Spitzer | 455/442 |
| 7,924,786 B2 | 4/2011 | Oh et al. | |
| 8,682,325 B1* | 3/2014 | Cooper | 455/436 |
| 2002/0032032 A1* | 3/2002 | Haumont et al. | 455/436 |
| 2002/0077103 A1* | 6/2002 | Bonta | 455/436 |
| 2002/0077144 A1* | 6/2002 | Keller | H04W 8/245 455/550.1 |
| 2003/0035464 A1* | 2/2003 | Dehner | H04W 36/0072 375/132 |
| 2003/0096620 A1 | 5/2003 | Ozturk et al. | |
| 2004/0077349 A1* | 4/2004 | Barak et al. | 455/436 |
| 2004/0127160 A1* | 7/2004 | Moilanen | 455/67.11 |
| 2004/0152480 A1* | 8/2004 | Willars et al. | 455/513 |
| 2005/0130655 A1* | 6/2005 | Lundh et al. | 455/434 |
| 2006/0121907 A1* | 6/2006 | Mori et al. | 455/447 |
| 2006/0121916 A1* | 6/2006 | Aborn et al. | 455/456.5 |
| 2006/0217121 A1* | 9/2006 | Soliman et al. | 455/446 |
| 2007/0097938 A1* | 5/2007 | Nylander et al. | 370/338 |
| 2007/0155421 A1* | 7/2007 | Alberth | H04B 7/18508 455/553.1 |

FOREIGN PATENT DOCUMENTS

| | | |
|---|---|---|
| JP | 2003319443 | 11/2003 |
| KR | 20020036102 A | 5/2002 |
| WO | 9606512 | 2/1996 |

OTHER PUBLICATIONS

International Search Report and Written Opinion of the International Searching Authority for International application No. PCT/US2007/025561 mailed Apr. 14, 2008.

International Preliminary Report on Patentability for International application No. PCT/US2007/025561 mailed Mar. 25, 2009.

* cited by examiner

DETECTING AND REPORTING A PICOCELL BY A MOBILE STATION

FIELD OF THE INVENTION

This invention generally relates to communication. More particularly, this invention relates to wireless communication.

DESCRIPTION OF THE RELATED ART

Wireless communication systems are well known and in widespread use. Many systems are referred to as cellular systems because of the way that wireless communication coverage is designed. Base station transceivers are arranged to provide wireless communication coverage over geographic areas surrounding the base station. The geographic area is typically referred to as a cell. Traditional base station transceivers provide relatively large geographic coverage and the corresponding cells can be referred to as macrocells.

It is possible to establish smaller-sized cells within a macrocell. These are sometimes referred to as picocells. One proposed way for establishing a picocell is to provide a picocell base station unit that operates within a relatively limited range within the coverage area of a macrocell. One example use of a picocell base station unit is to provide wireless communication coverage within a building, for example.

Various challenges are introduced by the possibility of having multiple picocells within a macrocell. It is necessary to be able to identify the picocells to facilitate accurate handovers between the macrocell and a desired picocell, for example. With the likely proliferation of many picocells, the task of identifying each of them uniquely becomes daunting. Further, there must be some mechanism for locating them for a possible handover.

It is necessary to generate a user-specific neighbor list that includes candidate cells that a mobile station can consider. In addition to the existing macrocells, it will become necessary to include a user's home or work picocell, for example, within the neighbor list. While creating a unique neighbor list for each user that includes such a picocell is one possibility, there are additional costs, complexity and signaling overheads on the network side, which render such an approach undesirable. For example, one radio network controller can control over 100 macrocell base stations and there could be thousands of picocells within the corresponding area. Providing unique neighbor lists for individual mobiles places too high a burden on the network.

Additionally, it is not desirable for a mobile station to continuously search for a home or work picocell because that wastes energy and reduces mobile battery life. Further, the possibility of scrambling code or PN offset re-use will result in incorrect picocell identifications.

There is a need for an efficient arrangement for identifying picocells in a manner that facilitates accurate handovers between a macrocell and a desired picocell.

SUMMARY

An exemplary method of communicating includes storing a locating neighbor list that corresponds to a mobile station being in a communication range of a selected picocell. Upon receiving a current neighbor list, a determination is made whether the current neighbor list corresponds to the stored, locating neighbor list. If there is sufficient correspondence, that indicates that the mobile station is in a communication range of the picocell.

An exemplary wireless communication mobile station device includes a storage having a locating neighbor list corresponding to the mobile station being in a communication range of a selected picocell. The mobile station device includes a transceiver for receiving a current neighbor list. A detection module is configured to determine whether the current neighbor list corresponds to the locating neighbor list. When there is sufficient correspondence, that indicates that the mobile station is in a communication range of the picocell.

The various features and advantages of a disclosed example will become apparent to those skilled in the art from the following detailed description. The drawings that accompany the detailed description can be briefly described as follows.

DETAILED DESCRIPTION

Figure 1:
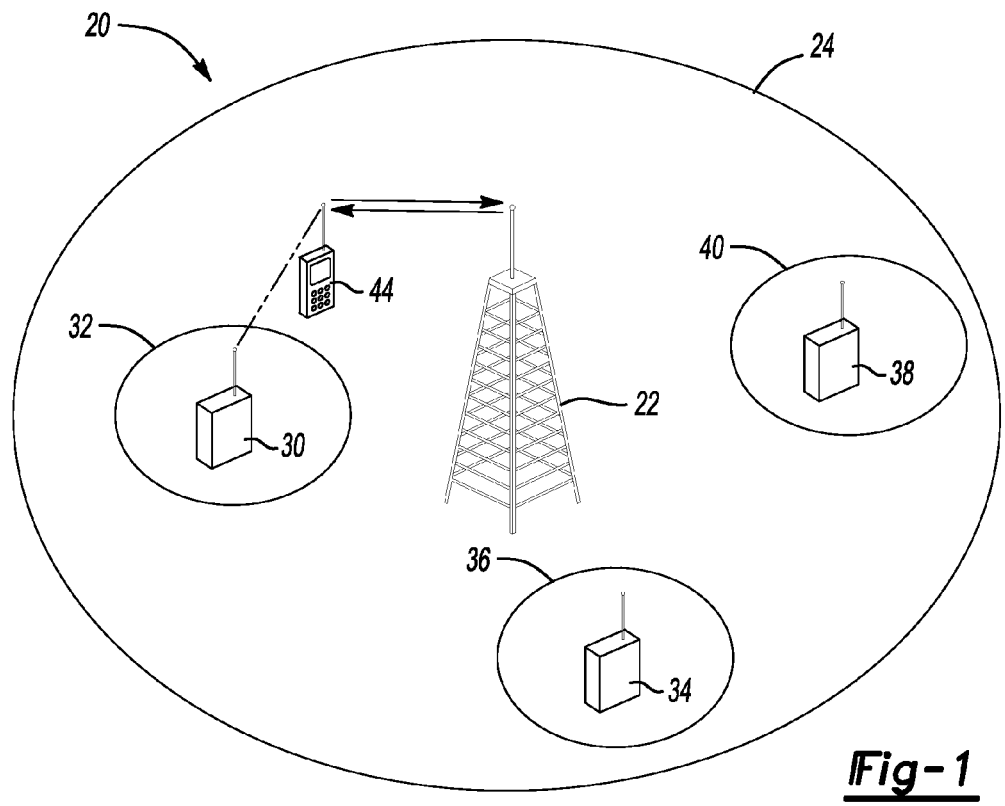
FIG. 1 schematically shows selected portions of a wireless communication system that is useful with an embodiment of this invention.

FIG. 1 schematically illustrates selected portions of a communication system 20. A base station 22 includes a base station transceiver unit and appropriate radio communication equipment for conducting wireless communications in a generally known manner. The base station 22 establishes a wireless communication coverage area 24 that is referred to as a macrocell for purposes of discussion. The geographic region of the macrocell 24 will depend on, in part, the capabilities of the base station 22 and the surrounding geography. There are known techniques for establishing a desired macrocell coverage area.

Within the macrocell 24, a picocell base station unit (PCBSU) 30 provides wireless communication coverage within a picocell 32. As can be appreciated from the illustration, the size of the coverage area of the picocell 32 is much smaller than that of the macrocell 24. The illustration is not to scale but the point is that the picocell coverage area of the picocell 32 is much smaller than that of the macrocell 24. In one example, the picocell 32 corresponds to the user's home. Another PCBSU 34 provides wireless coverage within a picocell 36. Still another PCBSU 38 provides a picocell coverage area 40.

It is possible for a mobile station 44 within the macrocell 24 to communicate with the macrocell by communicating with the base station 22 in a known manner. When the mobile station 44 enters into a picocell area where that mobile station is authorized for communications within the picocell, it will be desirable to handover from the macrocell 24 to the corresponding picocell. In the illustrated example, the user of the mobile station 44 has rights for using the communication capabilities of the PCBSU 30 for communicating within the picocell 32.

Figure 2:
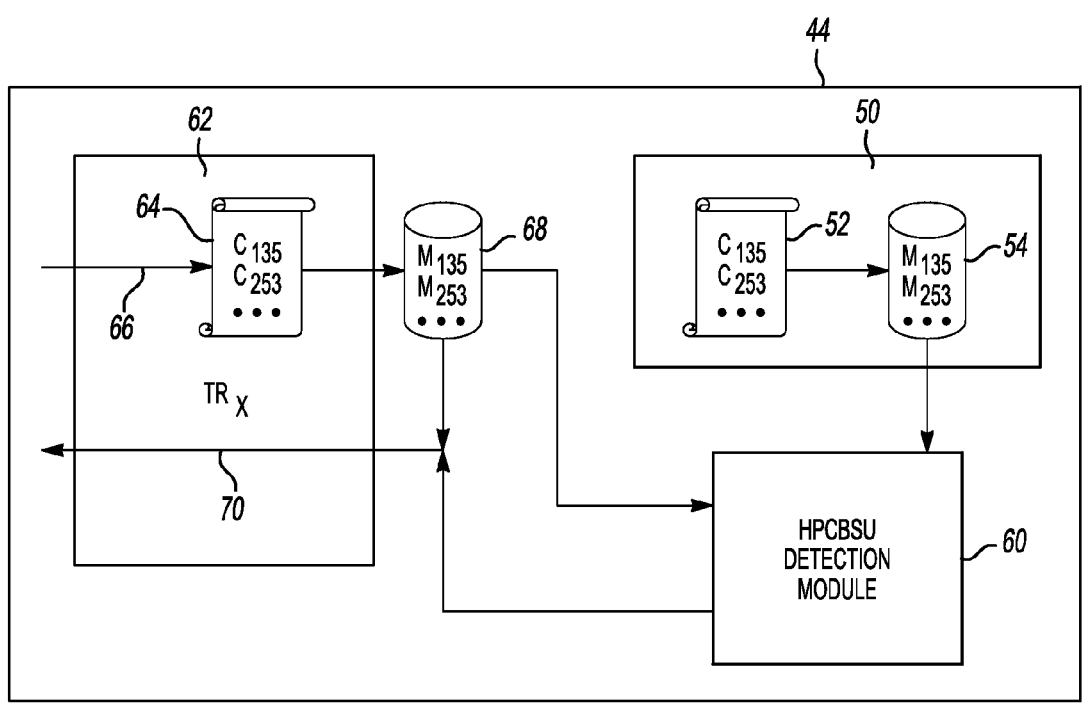
FIG. 2 schematically shows selected portions of an example mobile station and schematically illustrates one example approach.

The example mobile station 44 has a capability of detecting and reporting the picocell 32 when it comes into a communication range where the mobile station 44 can communicate with the PCBSU 30. FIG. 2 schematically shows selected portions of the mobile station 44. A memory or storage 50 includes a locating neighbor list 52 corresponding to at least one time when the mobile station 44 is in a communication range of the picocell 32. In one example, the mobile station 44 stores the neighbor list from a time when registering the mobile station 44 with the PCBSU 30. This may occur during installation of the PCBSU or an initial use of the mobile station 44 within the picocell 32, for example. In one example, when the mobile station 44 has an active communication link with the PCBSU 30, it stores the neighbor list available to it at that time as the locating neighbor list 52.

The illustrated example storage 50 also includes a plurality of measurements 54 that are made by the mobile station 44 at a time associated with the stored locating neighbor list 52. For example, the mobile station 44 makes a plurality of measurements from at least some of the macrocell base stations or PCBSUs within the locating neighbor list 52.

The locating neighbor list 52 will include at least a plurality of macrocell base station identifiers. In some examples, the locating neighbor list 52 will include PCBSUs associated with nearby picocells, if appropriate. The mobile station 44 uses the stored locating neighbor list 52 for purposes of determining when it is nearby or within the picocell 32. The illustrated example includes a PCBSU detection module 60 that utilizes the stored locating neighbor list 52 for determining when the mobile station 44 is in a communication range of the picocell 32.

The mobile station 44 includes a transceiver portion 62 that communicates with the serving macrocell base station 22. The transceiver portion 62 receives a current neighbor list 64 provided by a macrocell radio network controller, for example, as schematically shown at 66. The PCBSU detection module 60 determines whether the current neighbor list 64 corresponds to the stored locating neighbor list 52. In one example, the PCBSU detection module 60 determines whether there is an identical match between the current neighbor list 64 and the locating neighbor list 52. In another example, the PCBSU detection module 60 is capable of determining a level of correspondence between the current neighbor list 64 and the locating neighbor list 52. If the amount of correspondence exceeds a threshold, the PCBSU detection module 60 determines that there is sufficient correspondence between the current neighbor list 64 and the locating neighbor list 52 to indicate that the mobile station 44 is likely within a communication range of the picocell 32.

The amount of correspondence may be based upon various factors such as a percentage of matching cell codes within the neighbor lists 64 and 52. Another example technique for determining an amount of correspondence between the neighbor lists 64 and 52 when they are not identical is to use measurements obtained by the mobile station 44 associated with each list. The stored measurements 54 may be compared to a set of current measurements 68 obtained by the mobile station 44 at the time of trying to determine whether the current neighbor list 64 sufficiently corresponds to the locating neighbor list 52. One example includes determining whether at least a minimum percentage of the current power measurements correspond to the stored measurements 54. If there is sufficient correspondence between at least some of the measurements and there is sufficient correspondence between the members of the neighbor list 64 and the locating neighbor list 52, the PCBSU detection module 60 in one example determines that the mobile station 44 is within a communication range of the picocell 32. Another example technique includes using signal timing information as a metric for determining correspondence or similarity between the neighbor lists. Given this description, those skilled in the art will be able to determine an appropriate correlation technique and appropriate thresholds to meet the needs of their particular situation.

An example that includes requiring some amount of correlation between a current neighbor list and a stored locating neighbor list provides an advantage over an arrangement where an exact match between the neighbor lists is required. For example, if there is a change in the macrocellular configuration over time, that could cause a change in a current neighbor list such that it would not match an out-dated, previously stored locating neighbor list.

Once the mobile station 44 determines that there is sufficient correspondence between the current neighbor list 64 and the locating neighbor list 52, the mobile station 44 begins to perform measurements for the PCBSU 30 cell code (e.g., UMTS scrambling code or CDMA PN offset or an equivalent). In one example, the mobile station 44 also begins to perform measurements for neighboring PCBSUs to assist in identifying whether the mobile station 44 is, in fact, in the vicinity of the picocell 32.

When the mobile station 44 detects the PCBSU 30 signal, it reports the cell code of the PCBSU 30 back to the macrocell base station 22 as schematically shown at 70. The PCBSU 30 is, therefore, reported as part of the mobile station's detected set. The radio network controller associated with the macrocell base station 22 responsively includes the PCBSU 30 in the measured set and requests measurements from the mobile station 44 regarding the picocell 32.

Once measurements from the picocell 32 indicate that the mobile station 44 obtains a sufficient signal from the PCBSU 30, the radio network controller initiates a handover from the macrocell 24 to the picocell 32. After successful handover, the mobile station 44 in one example updates the stored locating neighbor list 52 and measurements 54 while the mobile station 44 is in the picocell 32. Periodically updating the locating list 52 and the measurements 54 allows for accommodating changes that may have occurred in the macrocellular configuration or the picocellular configuration of the surrounding area in the vicinity of the picocell 32. This example technique allows for adapting to network changes such as the addition of a new base station in the area.

The disclosed example provides a technique for a mobile station to determine when it enters a communication range of a selected picocell. The task of identifying when that occurs, which corresponds to the mobile station requiring a modified neighbor list that includes the PCBSU of a selected picocell, is assigned to the mobile station. This de-centralized approach relieves any burden from the network side such that specialized neighbor lists need not be handled by the radio network controller of the macrocell network. Instead, the mobile station 44 attempts to correlate a currently received neighbor list with the locating neighbor list. The mobile station 44 only needs to search for the PCBSU of a selected picocell when the probability of success for locating that picocell is high. This is based upon a sufficient correspondence between the current neighbor list 64 and the stored locating neighbor list 52. Searching for a particular PCBSU only when there is a likelihood of finding it saves battery power for the mobile station.

One advantage to the disclosed example is that it allows for mobile stations to use a stored locating neighbor list and measurement results to identify when the mobile station is in proximity to a selected picocell. The disclosed example provides a robust picocell area detection even when an overall network configuration changes. Because the disclosed example delegates the task of identifying proximity to a selected picocell to a mobile station, it provides cost savings by reducing complexity and signaling overhead on the network side. Additionally, by limiting the amount of time a mobile station spends searching for a particular picocell, power consumption is reduced and battery life is increased. Another advantage to the disclosed example is that it reduces the likelihood of incorrect picocell identifications, which may otherwise occur because of cell code re-use, for example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising the steps of:
    storing a locating neighbor list from a time when a mobile station has an established communication link with a selected picocell;
    storing power measurements associated with each of a plurality of cells in the locating neighbor list;
    receiving a current neighbor list subsequent to the storing;
    determining whether the current neighbor list corresponds to the locating neighbor list as an indication that the mobile station is in a communication range of the picocell;
    determining current power measurements associated with at least some of the plurality of cells that are also in the current neighbor list;
    determining whether the current power measurements correspond to the stored power measurements; and
    performing at least one measurement regarding the picocell for initiating a handover to the picocell if the current neighbor list corresponds to the locating neighbor list.

2. The method of claim 1, comprising
    registering the mobile station with the picocell station.

3. The method of claim 1, comprising
    performing measurements for a cell code of the picocell responsive to determining that the current neighbor list corresponds to the locating neighbor list,
    wherein the current neighbor list corresponds to the locating neighbor list when the current neighbor list is the same as or similar to the locating neighbor list.

4. The method of claim 3, comprising
    detecting the picocell; and
    reporting the picocell to a base station currently serving the mobile station.

5. The method of claim 4, comprising
    handing over from a currently serving base station to the picocell responsive to detecting the picocell.

6. The method of claim 1, comprising
    updating the stored locating neighbor list upon establishing a new communication link with the picocell.

7. The method of claim 1, comprising
    determining whether the current neighbor list and the locating neighbor list are identical.

8. A wireless communication mobile station device, comprising
    a storage including a locating neighbor list from a time when the mobile station has an established communication link with a selected picocell;
    a transceiver for receiving a current neighbor list; and
    a detection module configured to determine whether the current neighbor list corresponds to the locating neighbor list as an indication that the mobile station is in a communication range of the picocell,
    wherein
    the storage includes power measurements associated with each of a plurality of cells in the locating neighbor list; and
    the detection module is configured to determine current power measurements associated with at least some of the plurality of cells that are also in the current neighbor list and to determine whether the current power measurements correspond to the stored power measurements;
    wherein the mobile station device is configured to perform at least one measurement regarding the picocell for initiating a handover to the picocell if the current neighbor list corresponds to the locating neighbor list.

9. The device of claim 8, comprising
    a controller that is configured to perform measurements for a cell code of the picocell responsive to the detection module determining that the current neighbor list corresponds to the locating neighbor list,
    wherein the current neighbor list corresponds to the locating neighbor list when the current neighbor list is the same as or similar to the locating neighbor list.

10. The device of claim 8, wherein the storage is configured to update the stored locating neighbor list upon establishing a new communication link with the picocell.

11. The device of claim 8, wherein the detection module is configured to determine whether the current neighbor list and the locating neighbor list are identical.

12. The method of claim 1, wherein the locating neighbor list is stored by a mobile station, the current neighbor list is received by the mobile station and the determining is performed by the mobile station.

13. The method of claim 1, comprising
    storing the locating neighbor list during a selected time when the mobile station is in the communication range of the selected picocell;
    subsequently using the mobile station outside of the communication range of the selected picocell; and
    subsequently receiving the current neighbor list at a later time during which the mobile station is once again at least potentially in communication range of the selected picocell.

* * * * *